United States Patent

[11] 3,588,608

| [72] | Inventors | Michael J. Halinski<br>Arlington Heights;<br>Larry Wanschek, Chicago, Ill. |
|---|---|---|
| [21] | Appl. No. | 801,452 |
| [22] | Filed | Feb. 24, 1969 |
| [45] | Patented | June 28, 1971 |
| [73] | Assignee | Sun Electric Corporation |

[54] CIRCUIT PROTECTION APPARATUS FOR DISABLING HIGH VOLTAGE TO A CATHODE-RAY TUBE
9 Claims, 2 Drawing Figs.

| [52] | U.S. Cl.................................. 317/31, 315/20, 317/33, 328/9 |
| [51] | Int. Cl................................................. H02h 7/00 |
| [50] | Field of Search........................................... 315/20; 317/31, 33; 328/9; 307/108 |

[56] References Cited
UNITED STATES PATENTS

| 2,222,426 | 11/1940 | White et al. ............... | 315/20 |
| 2,536,712 | 1/1951 | Bentley ...................... | 315/20 |
| 3,320,440 | 5/1967 | Reed .......................... | 307/88.5 |

*Primary Examiner*—J. D. Miller
*Assistant Examiner*—Harry E. Moose, Jr.
*Attorney*—Molinare, Allegretti, Newitt & Witcoff

ABSTRACT: The cathode-ray tube of an oscilloscope can be protected when the horizontal sweep generator thereof fails to produce an output signal by providing a capacitor that is periodically discharged through a controlled rectifier in response to signals received from the horizontal sweep generator. If the horizontal sweep generator fails to produce an output signal, the controlled rectifier is not operated and the capacitor charges to a voltage sufficient to activate a switch device. The switch device, in turn, disables the high voltage power supply that operates the cathode-ray tube.

PATENTED JUN 28 1971

3,588,608

INVENTORS
MICHAEL J. HALINSKI
BY & LARRY WANSCHEK

Bair, Freeman & Molinare
ATTORNEYS 3,588,608

CIRCUIT PROTECTION APPARATUS FOR DISABLING HIGH VOLTAGE TO A CATHODE-RAY TUBE

BACKGROUND OF THE INVENTION

This invention relates to electrical circuit protection apparatus and is more specifically directed to electrical circuit protection apparatus that detects the failure of a circuit to produce an output signal.

Apparatus that protects electrical circuits against excessively large currents or voltages is well known in the electronics arts. However, in some types of equipment, it is also important to provide apparatus that protects an electrical system when a particular circuit within the system fails to produce an appropriate output signal. For example, if the horizontal sweep generator in an oscilloscope fails to produce an output signal, the electron beam produced by the cathode-ray tube thereof becomes relatively stationary and has all of its energy concentrated on a relatively small portion of the tube surface. This defect in operation generally burns the phosphorus on the surface of the tube exposed to the beam and may also damage circuitry associated with the tube.

SUMMARY OF THE INVENTION

In order to protect an electrical system when a particular circuit within the system fails to produce an output signal, the present invention basically comprises a capacitor that is normally discharged through a variable resistance device which periodically becomes conductive in response to signals produced by the particular circuit. If the signals are not produced, the device is not operated, and the capacitor charges to a voltage at which a switch device is energized in order to control the portion of the system requiring protection.

The above-described invention may be easily adapted to protect a cathode-ray tube of an oscilloscope in the event that the horizontal sweep generator thereof fails to produce an appropriate output signal. In such an embodiment of the invention, it is desirable to employ a variable resistance device capable of remaining in its conductive state until the capacitor is completely discharged during each cycle of operation. Applicants have discovered that a controlled rectifier is well suited for such a mode of operation. A controlled rectifier is preferably controlled by a series of well-defined periodic pulses. Surprisingly, it has been discovered that this result may be achieved by connecting the controlled rectifier to the output of the horizontal sweep generator through an ordinary transformer. The normal ramp-shaped signal produced by the horizontal sweep generator is differentiated by the transformer so that a series of periodic pulses perfectly suited for controlling the controlled rectifier are produced. Another unique feature of this embodiment includes a regenerative switch arrangement in which two switch devices, such as transistors, conduct current through a common resistor in order to control the hysteresis of the arrangement. The switch arrangement controls an output transistor that is connected to the control circuit of a DC to DC converter. The DC to DC converter, in turn, operates the electron beam of the cathode-ray tube.

If the horizontal sweep generator fails to produce an output signal, the controlled rectifier does not discharge the capacitor. The voltage across the capacitor then builds up until the switch arrangement and output transistor are activated. The output transistor, in turn, controls the control circuit so that the output voltage of the DC to DC converter and the intensity of the electron beam are reduced to safe levels.

Use of the unique combination of components described above safeguards the cathode-ray tube of an oscilloscope with a degree of reliability previously unattained. Each component is chosen to compliment the others in the system so that superior results are achieved by using a minimum number of parts.

DESCRIPTION OF THE DRAWING

The foregoing and additional advantages and features of the present invention will be described for purposes of illustration, but not of limitation, in connection with the accompanying drawing wherein.

DESCRIPTION OF THE PREFERRED EMBODIMENT

Figure 1:
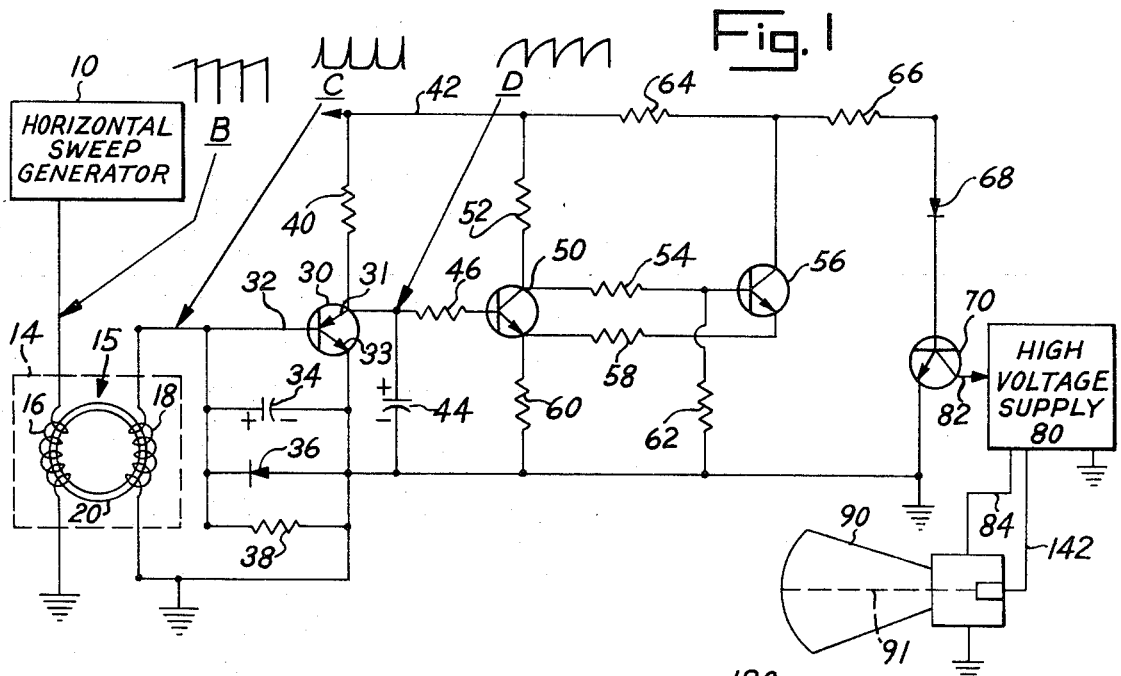
FIG. 1 is a schematic illustration of a preferred form of the present invention that is used to protect the cathode-ray tube and associated circuitry of an oscilloscope.

As shown in FIG. 1, a preferred form of circuit protection apparatus made in accordance with the present invention basically comprises an input circuit 14, a controlled rectifier 30, a capacitor 44, switch transistors 50, 56, and an output transistor 70.

Input circuit 14 is connected to the output of a horizontal sweep generator 10 that produces a ramp-shaped output signal identified by the letter B. The input circuit includes a transformer 15 having a primary coil 16 connected to the generator 10, a secondary coil 18, and a core 20. The type of input circuit described in FIG. 1 has the advantage of being able to differentiate the signal produced by generator 10 in order to form a series of periodic pulses such as those illustrated at letter C. Those skilled in the art will appreciate that periodic pulses of the type shown provide an excellent means of gating controlled rectifier 30. Accordingly, input circuit 14 provides an inexpensive and reliable means of producing the type of signal best suited to control controlled rectifier 30.

Controlled rectifier 30 consists of a transconducting path that extends from an anode 31 to a cathode 33, and a gate electrode 32 that is connected over the parallel combination of capacitor 34, diode 36, and resistor 38 to ground potential.

Charging capacitor 44 is connected to the transconducting path in the manner illustrated and is connected over a resistor 46 to the base electrode of transistor 50. Capacitor 44 is normally charged through resistor 40 and is normally discharged through controlled rectifier 30 so that a voltage of the form shown at letter D is produced across the capacitor.

Transistor 50 operates as a switch and has a collector electrode connected over a resistor 52 to a positive voltage supply conductor 42 and over a resistor 54 to the base electrode of transistor 56. The emitter circuits of transistors 50 and 56 share a common resistor 60. More specifically, the emitter electrode of transistor 56 is connected over a resistor 58 to the emitter electrode of transistor 50, and the emitter electrode of transistor 50, in turn, is connected over resistor 60 to ground potential. The bias voltage on the base electrode of transistor 56 is controlled by the combination of resistors 54 and 62. The collector of transistor 56 is connected over a resistor 66 and a diode 68 to the base electrode of output transistor 70. The collector electrode of transistor 70 is connected over conductor 82 to a high voltage supply 80. High voltage power is conducted over conductor 84 in order to produce electron beam 91 in cathode-ray tube 90.

Figure 2:
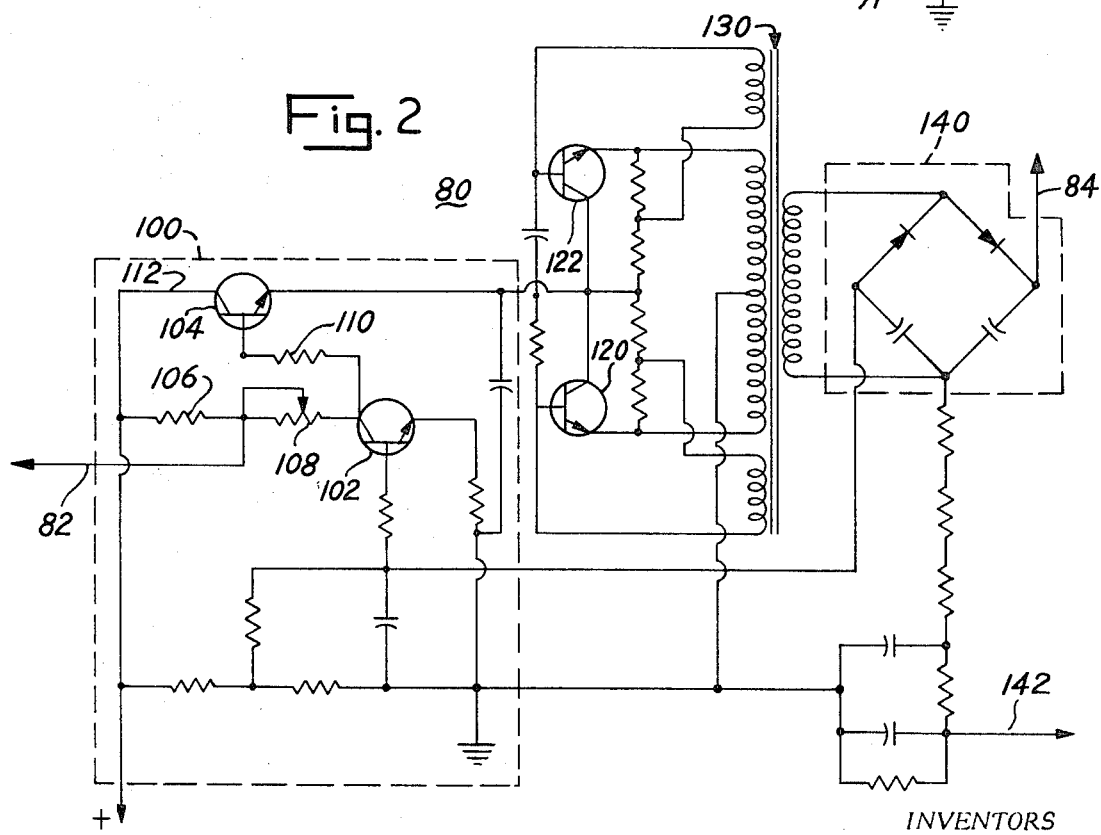
FIG. 2 is a schematic illustration of a DC to DC converter that is controlled by the apparatus shown in FIG. 1.

An exemplary high voltage supply 80 and a preferred manner of connecting transistor 70 thereto are illustrated in FIG. 2. Supply 80 basically comprises a DC to DC converter having a control circuit 100, driver transistors 120, 122, a transformer 130 and an output circuit 140. A DC reference voltage is supplied from a control grid of cathode-ray tube 90 over a conductor 142.

Control circuit 100 comprises a transistor 102 that has a collector electrode connected through resistors 106 and 108 to a positive voltage supply conductor 112. The junction of resistors 106 and 108 is connected to conductor 82. The collector electrode of transistor 102 is connected to the base electrode of a transistor 104 through a resistor 110.

Those skilled in the art will appreciate that transistors 120 and 122 normally oscillate in order to produce an AC voltage that is increased by transformer 130 and is rectified by output circuit 140. The magnitude of the AC voltage is controlled by transistor 104 which regulates the current supplied to the collector circuits of transistors 120 and 122.

The operation of the apparatus shown in FIGS. 1 and 2 will now be described assuming that generator 10 is producing an output signal of the type described. The signal produced by generator 10 is differentiated and applied to gate electrode 32 by input circuit 14. Resistor 38 is used to bias the gate electrode of controlled rectifier 30, and capacitor 34 is used as a filtering element therefor. Diode 36 prevents the signal on gate electrode 32 from establishing a voltage below ground potential.

Charging capacitor 44 is charged at a predetermined rate through resistor 40 and is discharged by the operation of rectifier 30. Rectifier 30 is normally in a nonconductive state so that capacitor 44 is charged in the manner described. However, when gate electrode 32 receives a pulse of positive voltage, rectifier 30 becomes conductive so that capacitor 44 is discharged through the transconductive path of rectifier 30 to ground potential. Rectifier 30 remains in its conductive state until the voltage across capacitor 44 has discharged to a voltage close to ground potential. The current flowing through rectifier 30 then decreases below the value needed to hold the rectifier in its conductive state and the rectifier than reverts to its nonconductive state. Thereafter, capacitor 44 charges until rectifier 30 again becomes conductive.

The use of a controlled rectifier to discharge capacitor 44 offers advantages over the analogous prior art methods. Since the rectifier remains fully conductive until the current flowing through its transconductive path decreases to an extremely small value, capacitor 44 is nearly discharged to ground potential during each cycle of operation. Accordingly, charge is dissipated from capacitor 44 at the maximum possible rate, thereby insuring that transistor 50 will remain nonconductive as long as an input signal is received from generator 10.

When rectifier 30 operates in the manner described, the voltage charged across capacitor 44 never becomes sufficiently large to cause transistor 50 to conduct. When transistor 50 is in its nonconductive state, the voltage at its collector electrode remains relatively high so that transistor 56 conducts a substantial amount of current. Current flowing through transistor 56 is conducted through resistors 58 and 60 so that the voltage at the emitter electrode of transistor 50 is increased. This mode of operation prevents transistor 50 from conducting until capacitor 44 has been charged to a voltage having a predetermined value.

As previously explained, when transistor 56 is conducting, most of the current flowing through resistor 64 is shunted to ground potential so that the small amount of remaining current flowing through resistor 66 and diode 68 is insufficient to cause transistor 70 to conduct. Since transistor 70 is not conducting, it has no effect on control circuit 100, and the cathode-ray tube 90 operates in a normal manner.

The operation of the apparatus described in FIGS. 1 and 2 will now be explained assuming that horizontal sweep generator 10 fails to produce an output signal. Since no signal is received by input circuit 14, no signal appears at the gate electrode of rectifier 30, and the rectifier is not switched to its conductive state. As a result, capacitor 44 continuously charges through resistor 40 until the voltage thereon is sufficiently large to cause transistor 50 to conduct. As soon as transistor 50 is conductive, the voltage at its collector electrode is reduced so that transistor 56 is switched to its nonconductive state. The voltage established across resistor 60 due to the conduction of transistor 50 also tends to cause transistor 56 to revert to its nonconductive state. Accordingly, those skilled in the art will appreciate that the hysteresis of the switch circuit comprising transistors 50 and 56 may be conveniently altered by adjusting the values of resistors 58 and 60.

When transistor 56 is nonconductive, current flowing through resistor 66 and diode 68 increases sufficiently to cause transistor 70 to conduct a substantial amount of current. As a result, the voltage on conductor 82 is substantially reduced, and the amount of current flowing through transistors 102 and 104 (FIG. 2) and the collector circuits of transistors 120 and 122 is likewise reduced. This reduction in current prevents transistors 120 and 122 from oscillating and reduces the output voltage on conductor 84 to approximately 0 volts. As a result, the intensity of the electron beam produced by cathode-ray tube 90 and the voltage supplied to the associated circuitry therein is reduced to nearly 0.

As previously explained, if the horizontal sweep generator fails to produce an output signal, the electron beam is concentrated in a relatively small area of the cathode-ray tube surface. This mode of operation could permanently damage the phosphorus in the area of the tube affected if the intensity of the beam were not reduced. Accordingly, the present invention provides an extremely reliable and efficient method of protecting the cathode-ray tube and its associated circuitry.

Those skilled in the art will appreciate that the present invention has numerous applications aside from the protection of a cathode-ray tube and that certain of the components described in the preferred embodiment may be altered without departing from the spirit and scope thereof.

We claim:

1. Circuit protection apparatus for disabling a first circuit when a second circuit ceases to produce an output signal, said apparatus comprising in combination:

a capacitor;

a resistive circuit path connected between said capacitor and a DC voltage source for charging said capacitor at a predetermined rate;

variable resistance semiconductor means having a transconductive path that is rendered conductive in response to a voltage pulse, said transconductive path remaining conductive after the termination of the voltage pulse until the current flow through the path decreases to a predetermined value;

current-sensing means connected between said second circuit and said variable resistance semiconductor means for periodically producing a voltage pulse in response to said output signal so that said transconductive path is periodically rendered conductive;

means for connecting said capacitor to said variable resistance semiconductor means whereby the capacitor is discharged whenever said transconductive path is rendered conductive;

switch means connected to said capacitor for producing a control signal in response to the voltage across the capacitor; and output means for disabling said first circuit in response to the control signal and for automatically enabling said first circuit in the absence of the control signal.

2. Apparatus, as claimed in claim 1, wherein the current-sensing means comprises a transformer having a primary winding connected to the second circuit and a secondary winding connected to the variable resistance semiconductor means.

3. Apparatus, as claimed in claim 1, wherein the switch means comprises:

a first switch device connected to said capacitor, said first switch device being arranged to conduct current if the voltage across the capacitor exceeds a predetermined voltage; and a second switch device connected between said output means and ground potential, said second switch device being controlled by said first switch device and being arranged to divert current from said output means whenever said first switch device is nonconductive.

4. Apparatus, as claimed in claim 1, wherein the switch means comprises:

a first transistor having its base electrode operatively connected to said capacitor and its emitter electrode connected through a first resistor to a voltage supply terminal; and a second transistor having its base electrode operatively connected to the collector electrode of said first transistor and having its emitter electrode operatively connected through a second resistor and said first resistor to said voltage supply terminal.

5. Apparatus, as claimed in claim 4, wherein the output means comprises a transistor having its base electrode operatively connected through a diode and a resistor to the collector electrode of said second transistor.

6. Circuit protection apparatus for preventing damage to a cathode-ray tube of an oscilloscope due to a defect in the horizontal sweep generator of the oscilloscope comprising in combination:
- a variable resistance semiconductor device having a transconductive path and a gate electrode that renders the transconductive path conductive whenever the voltage on said gate electrode exceeds a predetermined value;
- current-sensing means connected between said horizontal sweep generator and said gate electrode for periodically producing a signal proportional to the rate of change of the current produced by said horizontal sweep generator so that the gate electrode periodically receives a voltage signal exceeding said predetermined value;
- a capacitor;
- means for connecting said capacitor to said transconductive path whereby said capacitor is normally discharged through said transconductive path and is normally maintained at a voltage less than a predetermined voltage;
- a resistive circuit path connected between said capacitor and a DC voltage source for charging said capacitor to a voltage exceeding said predetermined voltage if said transconductive path is not periodically rendered conductive;
- a source of high voltage for operating said cathode-ray tube;
- output means for reducing the magnitude of the voltage produced by said source; and
- semiconductor switch means connected to said capacitor for enabling said output means whenever the voltage across the capacitor exceeds said predetermined voltage.

7. Apparatus, as claimed in claim 6, wherein the current-sensing means comprises a transformer having a primary winding connected to said horizontal sweep generator and a secondary winding connected to said gate electrode, and wherein said variable resistance semiconductor device comprises a controlled rectifier.

8. Apparatus, as claimed in claim 6, wherein said source of high voltage comprises a DC to DC converter having a control circuit and an output circuit, and wherein said output means comprises a transistor connected between said control circuit and ground potential.

9. Apparatus, as claimed in claim 2, wherein the variable resistance semiconductor means comprises a controlled rectifier.